United States Patent [19]

Levinson

[11] 3,985,991

[45] Oct. 12, 1976

[54] METHODS OF MICROWAVE HEATING IN METAL CONTAINERS

[76] Inventor: Melvin L. Levinson, 1 Meinzer St., Avenel, N.J. 07001

[22] Filed: Sept. 24, 1973

[21] Appl. No.: 400,416

Related U.S. Application Data

[63] Continuation-in-part of Ser. No. 281,182, Aug. 16, 1972, abandoned, which is a continuation-in-part of Ser. No. 193,940, Oct. 29, 1971, Pat. No. 3,731,037, which is a continuation-in-part of Ser. No. 704,389, Feb. 9, 1968, Pat. No. 3,701,872, which is a continuation-in-part of Ser. No. 483,144, Aug. 27, 1965, abandoned.

[52] U.S. Cl. ................ 219/10.55 E; 219/10.55 M; 426/243
[51] Int. Cl.² .......................................... H05B 9/06
[58] Field of Search ............. 219/10.55 E, 10.55 R, 219/10.55 M; 426/241, 243; 126/390; 99/425

[56] References Cited
UNITED STATES PATENTS

| | | | |
|---|---|---|---|
| 2,495,435 | 1/1950 | Welch | 219/10.55 E |
| 2,582,174 | 1/1952 | Spencer | 219/10.55 E |
| 2,599,033 | 6/1952 | Wild | 219/10.55 E |
| 2,600,566 | 6/1952 | Moffett | 219/10.55 E |
| 2,622,187 | 12/1952 | Welch | 219/10.55 E |
| 2,714,070 | 7/1955 | Welch | 219/10.55 E |
| 2,830,162 | 4/1958 | Copson et al. | 219/10.55 E |
| 3,179,780 | 4/1965 | Venstraten | 219/10.55 E |
| 3,219,460 | 11/1965 | Brown | 219/10.55 E |
| 3,230,864 | 1/1966 | Krajewski | 219/10.55 E |
| 3,256,101 | 6/1966 | Arms | 219/10.55 M |
| 3,271,169 | 9/1966 | Baker et al. | 219/10.55 E |
| 3,539,751 | 11/1970 | Levinson | 219/10.55 E |

*Primary Examiner*—Bruce A. Reynolds

[57] ABSTRACT

Methods of using an improved heating member for microwave heating comprising: (1) a microwave reflective, heat-conductive container with an obverse surface which limits the depth of penetration of microwave energy into an oven load when said load is located in surface contact thereon and with a reverse surface which shields, from exposure to microwave energy, liquid condensation when received thereon, and (2) a microwave-permeable, liquid-absorptive body disposed to absorb liquid from said reverse surface and transport by capillary action said liquid to a location exposed to said microwave energy.

15 Claims, 5 Drawing Figures

METHODS OF MICROWAVE HEATING IN METAL CONTAINERS

CROSS-REFERENCE TO RELATED APPLICATIONS

Continuation-in-part of Ser. No. 281,182, Aug. 16, 1972, abandoned, which is a continuation-in-part of Ser. No. 193,940, Oct. 29, 1971, Pat. No. 3,731,037, which is a continuation-in-part of Ser. No. 704,389, Feb. 9, 1968, Pat No. 3,701,872, which is a continuation-in-part of Ser. No. 483,144, Aug. 27, 1965, abandoned.

BACKGROUND OF THE INVENTION

1. Field of the Invention

This invention concerns improvements in methods of employing containers designed to heat food in a microwave oven. It is particularly useful for defrosting and heating frozen convenience foods packaged on aluminum foil trays in paper containers.

2. Description of Prior Art

A microwave oven is a time saving cooking device. But, for microwave cooking, prior art teaches: (1) conventional methods of preparing and cooking foods and conventional cooking containers must be changed, (2) microwave cooking will not brown, broil, crust and fry without an auxilary heat source or a microwave lossy heating element, (3) metal cooking containers have little, if any, utility, and (4) two dinners, cooked simultaneously, take twice the time to cook as one dinner, three dinners three times as long as to cook, etc.

This invention obviates said prior teachings and teaches that conventional metal cooking containers, in particular, aluminum foil cooking containers have the same utility in a microwave oven that enjoy in gas and electric ovens. In my parent application, U.S. Ser. No. 483,144, filed Aug. 27, 1965, and abandoned in favor of my U.S. Pat. No. 3,701,872, 3,731,037, 3,777,099 and 3,881,027, there are described implements which permit microwave ovens to brown, crust, barbecue, fry and broil as do conventional gas and electric ovens. In said related inventions, there are described implements which permit a permanent lossy number to absorb appreciable amounts of microwave energy and convert said microwave energy to heat energy for application to the surface of a cooking foodstuff thereby assisting in the crusting, browning and frying of said foodstuff. My U.S. Pat. No. 3,881,027 also describes the utility of a lining porous to lossy liquids which recycles lossy liquids condensing on a metal foil container's outer surface and along with my U.S. Pat. No. 3,731,037 teaches apparatus and methods of monitoring the temperature of a microwave heating chamber.

Welch, in U.S. Pat. No. 2,714,070, teaches the use of microwave-reflective material to selectively shield parts of a microwave oven load from direct exposure to microwave radiation. my parent application, U.S. Ser. No. 483,144, filed Aug. 27, 1965, and abandoned in favor of my copending related applications, teaches the use of a mircowave-absorptive, heating member to heat a microwave-reflective, heat-conductive member which heated member thence heats a shielded foodstuff. My present invention improves on my aforementioned U.S. Patents and applications by timely providing heat to the bottom of a microwave-reflective, heat-conductive food container to timely heat a shielded surface of a foodstuff located topside of said food container. This timely heating has express utility in reconstituting frozen convenience foodstuffs which are packaged on aluminum trays within paper boxes. This invention teaches how to improve the paper box so that it has utility during the packaging, freezing, shipping, defrosting, heating, serving and dining intervals associated with the preparation and use of frozen convenience foods. For example, a food processor will package and freeze convenience foodstuffs in my improved container, determine the optimum cooking time and post said cooking time on the container's label. Subsequently, an operator of a microwave oven need only remove the package from the freezer, insert the package in a microwave oven and energize the oven for the time prescribed for the power level of the oven. During the time interval from the purchase of the frozen convenience foodstuff until it is consumed and the empty foodstuff package is discarded, there is no special knowledge of microwave cooking, cooking effort or cleanup required.

SUMMARY OF THE INVENTION

It is an object of this invention to describe novel methods of using an improved, shipping-heating-serving and/or eating container for convenience foods heated in a microwave oven.

An object of this invention is to describe novel methods of using an improved food-heating, serving tray for use in microwave ovens whose thermally-conductive, food-receiving body results in more evenly heated food and whose heat-insulating body results in said food both warming faster and cooling slower.

And, it is an object of this inventio to describe methods of using an improved shipping container for convenience foods that is suitable for gas, electric and microwave cooking, is competively priced with conventional food containers and has added utility during microwave cooking and subsequent service.

The invention concerns a microwave-reflective, heat-conductive food container contained within a microwave permeable, non-lossy, heat-insulating, porous body where said body is so disposed as to absorb and disperse lossy liquid which evaporates from a cooking foodstuff and condenses on the reverse side of said food container when a frozen foodstuff, in direct thermal contact with the obverse side of said food container, cools said reverse side below its dew point.

BRIEF DESCRIPTION OF THE PREFERRED EMBODIMENTS

Figure 1:
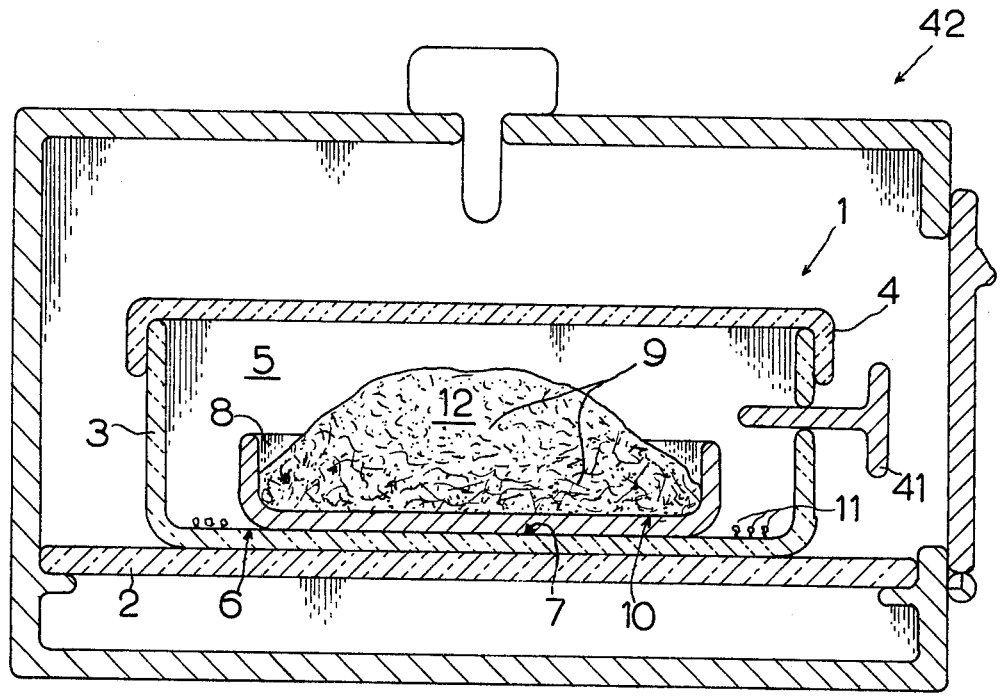
FIG. 1 is a cross section drawing of the food package of the invention.

FIG. 1 illustrates a cross section of a food package 1 resting on a shelf 2 of a microwave oven 42. Food package 1 consists of a container base 3 and a container top 4 which defines a closed heating chamber 5. Resting on the bottom wall 6 of chamber 5 is a food container 8 which receives a foodstuff 9 in direct thermal contact on food container 8's obverse surface 10. Food container 8 is constructed of a microwave-reflective, heat-conductive material, as aluminum foil. Because of its microwave-reflective properties, food container 8 shields that portion of foodstuff 9, located in proximety with obverse surface 10, from exposure to microwave radiation in a manner well known. Food container 8 must be of such design as not to totally shield foodstuff 9 from exposure to microwave radiation. For example, food container 8 should be of open construction and foodstuff 9 of such dimension as to permit at least a portion of foodstuff 9, remote from said obverse surface 10, to receive and convert microwave energy to heat energy. Container base 3 and container cover 4 are constructed of a microwave-permeable, porous material, as cardboard, unglazed ceramic, or open pore plastic foam. Baking temperatures, circa 350° – 400° F are routine and higher and lower temperatures a function of time, load size and power level. Low melting point plastic is contraindicated if cooking temperatures higher than said plastic's deformation temperature is anticipated. Thermometer, temperature monitoring means 41, can be used to monitor the temperature of foodstuff 9 during an exposure to microwave energy. The porous material should be designed to absorb and disperse any liquid condensation it contacts, as the action of blotting paper.

In FIG. 1, a discussion of the operation and utility of food package 1 follows: A frozen foodstuff 9 — located within foodpackage 1 on the obverse surface 10 of aluminum foil container 8 — is placed on a shelf 2 of a microwave oven (not shown) and exposed to microwave energy. Said obverse surface 10 limits the depth of penetration of microwave energy into said foodstuff 9 by receiving said foodstuff in surface contact thereon. Food container 8 is of such open construction and foodstuff 9 is of such dimension as to permit microwave energy to heat up an area 12 of foodstuff 9 remote from obverse surface 10. Area 12, which initially receives (for practical purposes) the full power output of a microwave generator (not shown), heats rapidly and evaporates hot vapor which fills closed heating chamber 5. Contained by chamber 5's walls, said hot vapor both condenses on and heats the exposed cool portions of container 8 and foodstuff 9.

The obverse surface 10 of heat-conductive container 8 is in direct thermal contact with frozen foodstuff 9. And, it is foodstuff 9, acting through heat-conductive container 8, which cools reverse surface 7 below its dew point in opposition to condensing hot vapor which heats reverse surface 7 above its dew point. It is the large mass of frozen foodstuff 9 whose cooling action initially predominates over the heating action of condensing vapor and keeps reverse surface 7 below its dew point. Hence, reverse surface 7, timely, receives the preponderance of condensation heating within chamber 5. Both chamber 5's walls, because of their low mass and heat insulating properties, and the cool exposed portion of foodstuff 9, because of foodstuff 9's poor thermal conductivity, possess only limited capacity to receive condensation heating.

It can be seen that heat-conducting container 8 functions as a heat exchanger to exchange the cold of a foodstuff located on its obverse surface with the latent heat of condensation of a hot vapor condensing to a liquid on a complementary reverse surface. This invention differs from my above-captioned, related inventions in that a microwave absorptive heating member is not fixed at and so initially present on the reverse side of a microwave-reflective, heat-conductive food container. This improvement means that unshielded area 12 of foodstuff 9 must defrost and warm before hot vapor can evolve and heat reverse surface 7. With this improvement, in fucntion and results similar to gas and electric heating, and exposed surface of foodstuff 9 (unshielded area 12) receives a head start over the rest of frozen foodstuff 9 by first receiving (1) the heat of fusion required to change a solid to a vapor (e.g. the heat energy required to defrost), (2) the heat energy required to raise it temperature to its evaporation point and (3) the heat of evaporation required to vaporize liquid from area 12.

This invention differs from my U.S. Pat. No. 3,731,037 and 3,881,027 in that, since no microwave absorptive heating member is present, the temperature monitoring means of this invention is monitoring the temperature of unshielded area 12 of foodstuff 9.

Microwave-permeable, liquid-absorptive container base 3 absorbs condensed liquid, as the capillary action of a blotter, from surface contact with reverse surface 7 and transports said received liquid to a location exposed to microwave energy where said liquid is vaporized and recycled within heating chamber 5. Optionally, if desired, evaporation from external surfaces of food package 1 (which evaporation would cool package 1) is prevented by applying a waterproof coating to said external surfaces.

Any liquid, which condenses and lies shielded on obverse surface 10, provides more gravy and in most cases eliminates need for basting. It should be noted that, as the heating process continues, some liquid, in contact with obverse surface 10, will vaporize in response to hotter vapors condensing on reverse surface 7.

Advantageously, when a foodstuff 9 is "broiled" (350°–400° F) within food package 1, container top 4 receives and blots splatter and container base 3 receives and blots any accidental spillage. Advantageously, after microwave heating is terminated, hot liquid remains, in liquid absorptive base 3, function to keep food package 1 hotter, for a longer time, than if said hot liquid remains were not present. Said latter results are similar to a conventional infant's feeding dish which is provided with an independent base chamber to receive hot water and is designed to hold food hot for extended periods of time.

The overall results of heating a TV Dinner, food package 1, in a microwave oven, are similar to the results that are obtained by heating the identical portions of food on an identical aluminum foil food container (notwithstanding the fact that food package 1's paper shipping container must be removed and discarded prior to heating) in a gas or an electric oven. In gas, electric or microwaves, positive means for an operator to control the level of heating power applied (i.e. variable power control) and a means to monitor temperature while heating is recommended for high power can cause charring and low power too even a heating.

To control the amount of browning, common table salt cyrstals 11 can be added to or salted on base 3. Initially, salt crystals 11 are non lossy but, when they are subject to melting ice and condensing water, salt water results. Salt water has a lower melting point than water and opposes the large frozen mass of frozen foodstuff 9 from temporarily freezing initial liquid condensation (i.e. forming frost) on reverse surface 7 and thereby, until said frost melts, defeating base 3's liquid absorptive and liquid dispersing function.

Figure 2:
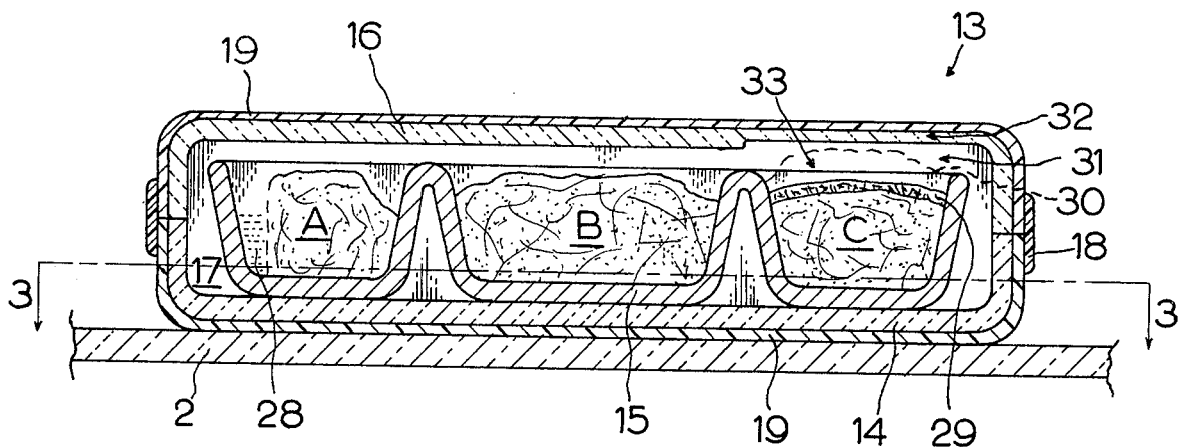
FIG. 2 is a cross section view of another embodiment of the food package of the invention.
Figure 3:
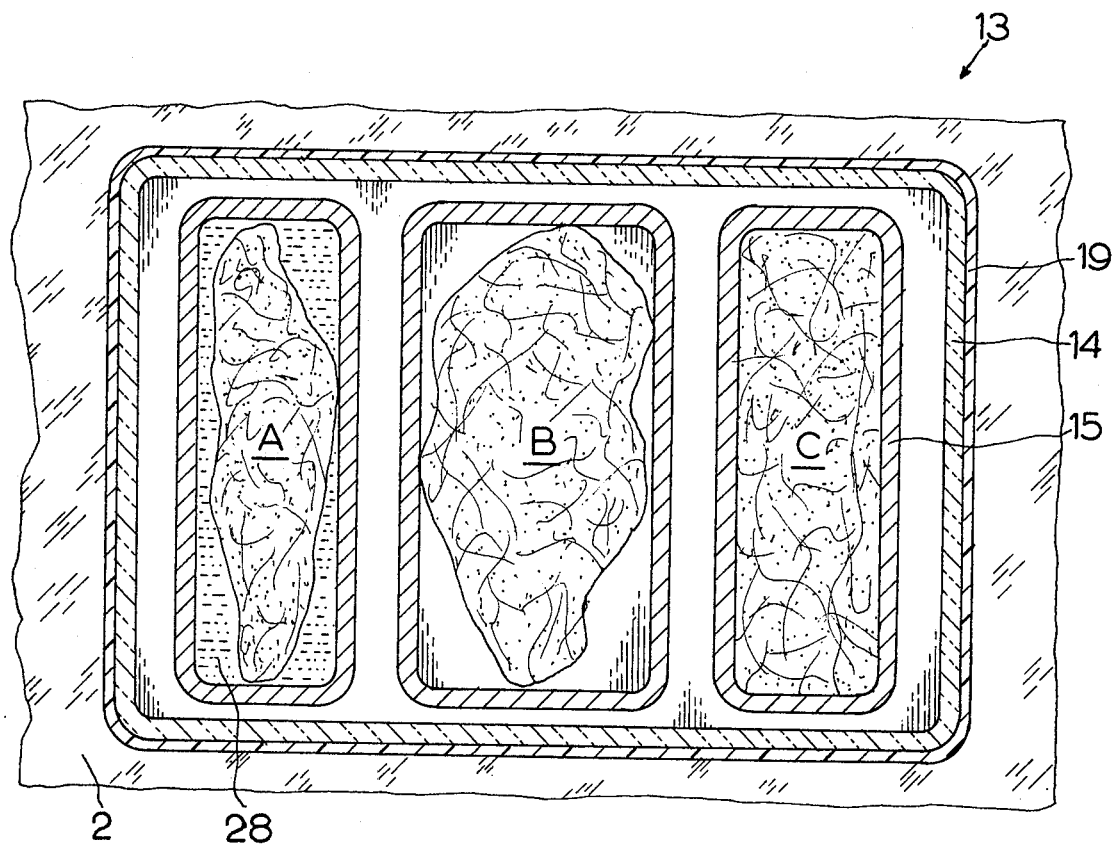
FIG. 3 is a cross section of the invention taken along 3—3 of FIG. 2.

In another embodiment, a food package 13 for use on shelf 2 in a microwave oven (not shown) is illustrated in FIGS. 2 and 3. Container base 14 contains open food container 15. Foodstuffs A, B and C are illustrated resting in individual compartments of food container 15. A removable top 16 mates with container base 14 to form a closed cavity 17. Container bottom 14 and top 16 are held together by a removable seal 18.

Bottom 14 and top 16 are made of a heat-insulating material which is permeable to microwave energy. At least a portion of bottom 14 is absorptive to liquids and capable of dispersing liquids by capillary action. It is preferred to cover the outside surface of bottom 14 and top 16 with a suitable waterproof coating 19, for example, plastic for paper and glass for ceramic.

Removable seal 18 keeps base 14 and top 16 sealed together during shipping, defrosting and heating. There are innumerable conventional means for securing base 14 to top 16 during shipping and storage with seal 18. For instance, gummed paper or plastic tape which can be designed to loosen when heated, clamps that melt, pull through threads, tongue and groove arrangements. If removable seal 18 is strong enough to permit a build up of explosive vapor pressure in closed cavity 17 during cooking, other safety measures should be taken.

Open metal food container 15 is constructed of any metal foil suitable for storing and cooking food therein. I prefer aluminum. Metal food container 15 must be of such open design that when exposed to microwave radiation said microwave radiation can penetrate at least a portion of each foodstuff A, B and/or C that is required to crust or brown.

Waterproof coating 19 is useful for both esthetic and sanitary purposes and to speed cooking. Waterproof coating 19 prevents liquid from reaching the outside of bottom 14 and top 16 and there waste power by said liquid evaporating and cooling food package 13. The loss of heat from the exterior surface of heat insulating bottom 14 and top 16 by radiation, conduction and convection is small compared to the large loss of heat, in the form of latent heat of vaporization, from said exterior surfaces. Still, some may prefer no waterproof coating 19 on bottom 14 and/or top 16 so (1) a drier heat will surround the foodstuff, or (2) to keep the exterior of food package 1, by the evaporation of liquid from its surface, cool enough to handle without pot holders notwithstanding that the interior of food package 1 can be at temperatures circa 350° F. Others can use a tighter seal 18 and a thicker waterproof coating 19 so that a more moist heat will surround the foodstuff.

In operation, the even heating of the foodstuff within food package 13 is caused by (1) microwave radiation, (2) radiant heat energy equalizing within a closed black body, (3) convected heat transfer within a closed chamber, (4) the equalizing effect of a large, low-mass, heat-conductive, aluminum container and (5) the transfer of the heat of vaporization of water when water evaporates from and so cools high loss foodstuffs and as a vapor transfers said heat of vaporizatioin to, and condenses on and so heats (and subsequently as a liquid makes lossy) low-loss foodstuffs. A surprisingly uniform serving temperature results even though food package 13 can contain different foodstuffs with different size portions and different loss factors and is subject to thermal runaway and microwave spot heating because of an irregular metal container. A microwave oven with a fully variable power control is preferred as too high a power can cause too much browning and crusting as in gas and electric cooking.

Figure 4:
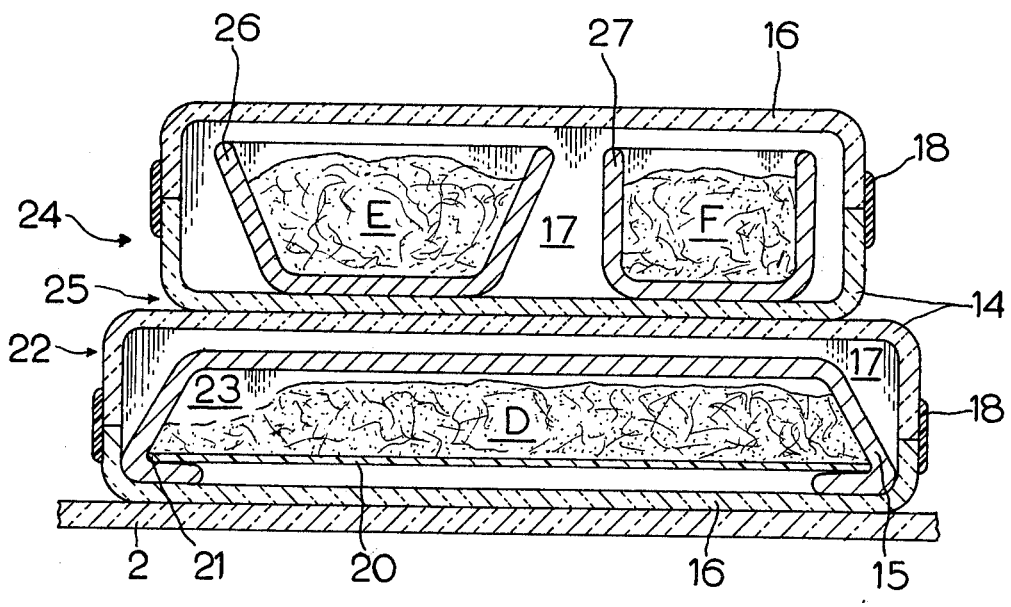
FIG. 4 is a cross section view of a composite view of the food packages of the invention showing other embodiments.

In FIG. 4, aluminum foil food container 15 is provided with a microwave-permeable, porous or non porous, paper or plastic lid 20 secured by aluminum flap 21 in a manner well known. Lid 20 secures foodstuffs D in aluminum foil container 15 during shipping. In this embodiment, food package 22 is heated in its inverted position to cook more uniformily certain densely-packed, not-too-liquid foodstuff D, as roast or spinach souffle. Inverted, the lossy liquid rendered from foodstuff D falls by gravity onto the upper surface of inverted lid 20 and is not, thereat, shielded by aluminum container 15. Because lid 20 is microwave permeable, microwaves evenly heat and vaporize lossy liquid falling thereupon and said vapor rises and circulates within enclosed inner chamber 23 and condenses on cold shielded portions of foodstuffs D. Whereupon, said condensed liquid again falls by gravity to lid 20. This process continues to recycle within chamber 23 formed by foil container 15 and lid 20. As foodstuff D, in inverted container 15, continues to heat, steam pressure builds up and steam escapes around lid 20 of foil container 15. Once outside foil container 15, said steam on escaping is initially confined by bottom 14 and top 16 within closed cavity 17 and condenses on and heats the outside of foil, heat-conductive container 15 whence, as liquid it drips down off foil container 15 onto porous top 16 where it is absorbed, dispersed and changed back into steam and the process recycled. Inverting food container 22 (with lid 20 engaged), during the heating interval, results in less crusting. Notwithstanding, satisfactory results are also obtained heating container 22 in its upright position. In the latter case, foodstuff D must be cooked at a lower power level for a longer time to prevent excessive browning and crusting.

FIG. 4 illustrates how multiple dinners, for example, foodstuff E in one foil container 26 and foodstuff F in a separate foil container 27, can be packaged as one unit, package 24. FIG. 4 illustrates how two packages 22 and 24, stacked in direct thermal contact by an abutment of their exterior adjacent surfaces 25, can be heated simultaneously. The time required to heat multiple food packages in said thermal contact is less than a multiple of the time required to heat one package. The more packages heated together and the more area in direct thermal contact the less area exposed to heat loss therefrom. Many food packages (i.e. TV Dinners) can be stacked together in direct thermal contact and heated in a microwave oven where the heat equalizing operation of the invention occurs throughout the stack by a mixing and a sharing of hot vapor. If necessary, to accomodate the operation of fixed-power output ovens, the stack can be reshuffled during the heating cycle.

Porous body material is initially somewhat lossy as porous material normally absorbs moisture from the surrounding air and frost covers frozen packages. Making bottom 14 and top 16 additionally lossy by the addition of lossy material, as ferrite, as described in my U.S. Pat. No. 3,777,099 and 3,881,027, is counterindicated (especially when bottom 14 and top 16 are paper which can ignite). Care must be exercised, as temperature monitoring, to keep plastic and paper bodies from igniting since, surprisingly, without added lossy material or independent heating member, temperatures circa 350° – 400° F, are both routine and swiftly and easily reached. Raw pie crusts on frozen pies defrost, rise and brown. The browning and baking that results in gas and electric cooking is duplicated and the advantages of microwave cooking (e.g. more gravies, less shrinkage, speed) are enhanced by package 13.

In FIG. 2a charge of water 28 can be added initially to porous bottom 14 and top 16 and/or foodstuffs A, B and/or C by a food processor and frozen in place for shipment. Said charge of water 28 (or other lossy liquid) is mandatory if foodstuffs heated are not partially liquid, lossy and/or too well shielded to receive microwave energy. Charge of water 28 can be added to porous bottom 14 or top 16 and there frozen. Frozen water 28 readily melts and evaporates during the initial exposure to microwave energy and condenses on the top surface of foodstuff C and thereupon flash defrosts said top surface to provide a desirable result as more or less crusting. Charge of water 28 can be useful to limit scorching of paper container bottom 14 and top 16, but, if used for this purpose, charge of water 28 will lengthen cooking time. Alternately, charge of water 28 can be added to one portion of a foodstuff on a TV Dinner to slow down its cooking time in relation to a second portion of foodstuff. Some raw frozen dough portions of foodstuff bake so fast in relation to other large mass foodstuffs as to bake and burn before said large mass foodstuff is heated properly. If immediately prior to defrosting and baking a charge of water 28 is added on top of a raw, frozen dough, said water does not have time to defrost or dilute said dough but, evaporates off the defrosting dough and thereby slows down the baking of said dough. As an alternate to or in conjunction with a charge of water 28, to provide some desirable result, some can cover with aluminum foil, portions of a TV Dinner during heating (not shown).

In FIG. 2, foodstuff C represents a foodstuff which increases in volume when cooked, for instance, a pie crust 29 which, when heated, rises to dotted line 30. A food processor should provide adequate space to accomodate rising baked products by either employing less raw dough, by thinning top 16 at location 32 or other such means. The wall of closed cavity 17 at location 32 can be coated with an anti-stick means at teflon (not shown) to prevent crust 29 from sticking to top 16.

In operation, in FIG. 2, open metal food container 15 contributes substantially to the baking, browning and crusting of foodstuffs cooked therein, For example, in the baking of a frozen pie whose crust 29 is at opening 33 of open metal food container 15, all the microwave energy is channeled into the inside of the pie, foodstuff C, through the raw pie crust 29 by the metal walls of container 15 (this contrasts to a microwave permeable glass container where microwave energy penetrates and enters all sides of the pie simultaneously). The only exit for escaping steam, a good heat insulating blanket, is opening 33 in metal container 15. While pie crust 29 is baking by said channeled microwave energy, it is not only heated and insulated by said blanket of superheated steam, but it is shielded by bottom 14 and top 16 from being cooled by cool air that is forced to circulate through conventional microwave oven cavities.

The cool walls of a microwave oven (not shown), the cool air conventionally forced through a microwave oven, water and water vapor and coating 19 all contribute to keeping paper and/or plastic bottom 14 and top 16 from igniting.

While food container 13 has been described as a useful shipping container, frozen convenience foods can be shipped in bulk and food package 13 utilized just for defrosting, heating and serving. Although, generally too fragile for shipping containers, a ceramic bottom 14 and top 16 whose outside surfaces are glazed and whose inner surfaces (i.e. walls of closed cavity 17) are unglazed porous ceramic, are excellent for defrosting, heating and serving a TV Dinner (contained in and on an aluminum tray) therein. In operation, the weight of top ceramic body 16 can be used to perform the sealing function of removable seal 18. Waterproof coating 19 can be two mating glass trays and bottom 14 and/or top 16 blotting paper to contain aluminum foil food container 13 where, after use, said blotting paper can be disposed of with splatter, spillage and waste.

Optionally, frozen convenience foods can be shipped in a non-porous package, for example, a frozen food on an aluminum tray within a plastic covered paper container and before heating a porous body added in contact with the reverse surface of said aluminum tray to create food package 13.

After the defrosting and heating interval, if top, heat-insulating body 16 is not removed from bottom, heat-insulating body 14, advantageously, foodstuffs can be held at serving temperatures for extended periods of time therein. Optionally, after a heating interval is completed, hot top 16 can be removed and placed under hot bottom 14 where heat energy stored in hot top 16, in conjunction with top 16's heat-insulating properties, combines with hot bottom 14 in keeping foodstuffs A, B and C hotter longer during the dining interval.

Figure 5:
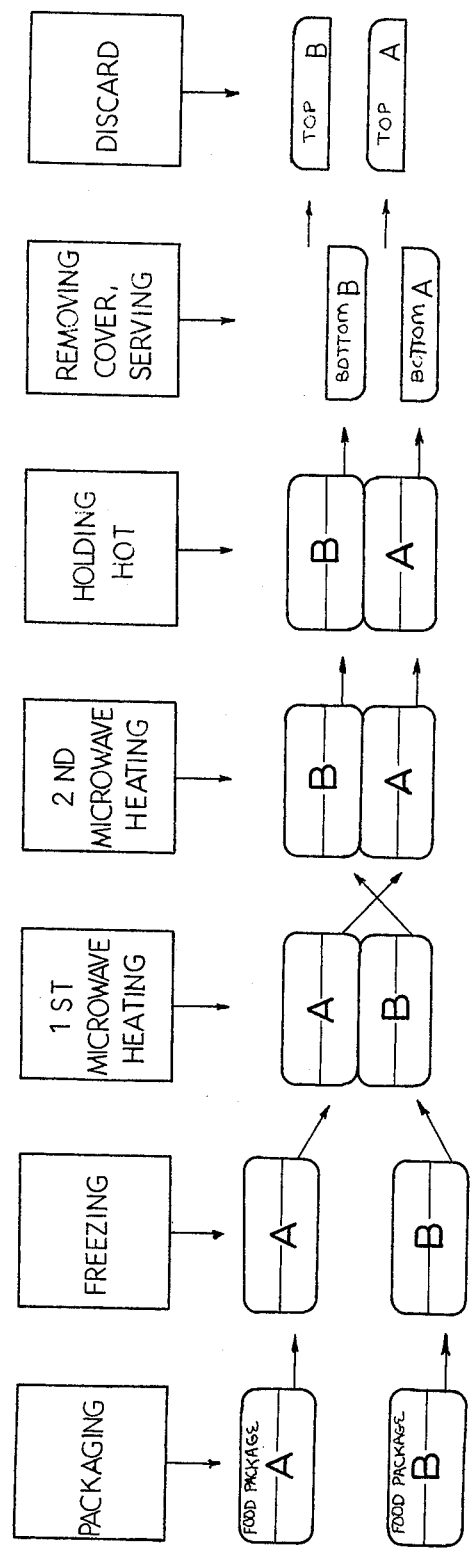
FIG. 5 is a composite diagram of various method steps of the invention.

In summary, FIG. 5 illustrates, from inception to final employment, one combination of ways to heat two food packages A and B together.

Although this invention has been described with a certain degree of particularity, it is understood that the present disclosure has been made only by way of example and that numerous changes in the details of construction and the combination and arrangement of parts may be resorted to without departing from the spirit and scope of the invention.

I claim:
1. In a method of heating an article in a microwave oven the steps which include:
   locating said article in thermal contact with an obverse surface of a microwave-shielding, heat-conductive container to partially shield an area of said article in said thermal contact with said obverse surface from direct exposure to microwave energy and to leave unshielded from said direct exposure to microwave energy a second area remote from said obverse surface,
   locating microwave-permeable, liquid-absorptive body at the-complementary-reverse-surface-of-said-obverse-surface of said container to absorb liquid condensation from said reverse surface and transport said liquid condensation away from the microwave shielding action of said reverse surface to a location exposed to microwave energy, and
   exposing said article, container and absorptive body to microwave energy within said microwave oven.

2. In a method of heating an article, according to claim 1, which includes the step of:
locating salt crystals in contact with said liquid-absorptive body to disolve in said liquid condensation and change said liquid condensation's physical properties.

3. In a method of heating an article in a microwave oven, according to claim 1, which includes the step of:
monitoring the temperature of said article during said exposure to microwave energy.

4. In a method of packaging and freezing frozen convenience food for subsequent defrosting and heating in a microwave oven, the steps which include:
placing a foodstuff in direct thermal contact with an obverse surface of a microwave-shielding, heat-conductive food receptacle,
locating a microwave-permeable, liquid-absorptive body at the complementary-reverse-surface-of-said-obverse-surface of said receptacle where said body is disposed to absorb and convey liquid condensation from contact with said reverse surface, where said condensation is partially shielded from exposure to microwave energy by said reverse surface, to a location not shielded from exposure to microwave energy during said subsequent defrosting and heating in a microwave oven,
packaging said foodstuff, receptacle and body for shipment, and
freezing said foodstuff.

5. In a method of defrosting and heating a frozen convenience food packaged on an aluminum tray, in a microwave oven, the steps which include:
placing, within said microwave oven, a package, designed to permit a build up of vapor pressure therein, which comprises said frozen convenience food located on an obverse surface of an aluminum serving tray packaged within a microwave permeable heating chamber where at least the portion of said heating chamber, disposed at the reverse surface of said obverse surface of said aluminum tray, is liquid absorptive and functions to convey liquid condensation from said reverse surface to a location more exposed to microwave energy within said heating chamber,
exposing said package to microwave energy to defrost and heat said frozen convenience food, and
removing said heated food package from said microwave oven.

6. In a method of heating foodstuff package in a microwave oven, according to claim 5, the added step of:
where a plurality of said packages are heated simultaneously in said microwave oven,
abutting said packages at at least one exterior surface of each package to permit hot vapor of each package to intermingle.

7. In a method of heating multiple sealed packages in a microwave oven, according to claim 6, the added steps of:
shuffling said plurality of packages, after said exposure to microwave energy and before removing said heated packages, to abut a different arrangement of liquid absorptive exterior surfaces of each package, and
reexposing said shuffled plurality of sealed packages to microwave energy.

8. In a method of heating a frozen convenience food in a microwave oven, according to claim 5, where said chamber's walls are at least partially heat-insulating, the added step of:
serving unopened said heated package where said heat insulating chamber functions, during a serving interval, to equalize spot and selective heating while said heat insulating chamber walls holds said heated food hot for a predetermined time prior to an eating interval.

9. In a method of heating a frozen convenience food in a microwave oven, according to claim 8, the added step of:
removing the top portion of said unopened heat insulating package to expose said heated food on said aluminum tray and continuing to use the bottom portion of said heat insulating package to contain and continue to hold warm said aluminum tray and said food during said eating interval.

10. In a method of heating at least one microwave-absorptive article in a microwave oven, the steps which include:
locating said article in thermal contact with a microwave-shielding, heat-conductive container so that said container partially shields a first area of said article from direct exposure to microwave energy and leaves unshielded from direct exposure to microwave energy a second area of said article remote from said container,
enclosing said article and said container within an enclosure of microwave-permeable, heat-insulating material, and subsequently
exposing to microwave energy said enclosure within said microwave oven until (1) said second area of said article absorbs and converts said microwave energy to heat energy and is heated, (2) said heated second area functions as a microwave-absorptive heating element and releases heat energy, (3) said heat-insulating enclosure confines said released heat energy and (4) said first area is heated by said confined, released heat energy which is received and conducted to said first area by said heat-conductive container acting as a heat exchanger.

11. In a method of heating an article, according to claim 10, the added step of:
removing said exposed, heat-insulating enclosure from said microwave oven,
holding unopened for a predetermined time said heated enclosure, and subsequently
opening said enclosure to provide access to said heated article.

12. In a process for heating a food package, in a microwave oven, where said package comprises a metal container holding a food within a microwave-permeable, heating chamber which chamber includes means to impede vapor release therefrom, the steps which include:
placing said food package within said microwave oven,
exposing to microwave energy said food package until a first area of said food, exposed to microwave energy, heats to a temperature high enough to evaporate hot vapor and said vapor, confined within said chamber by said means to impede vapor release therefrom, condenses on the side of said metal container opposite said food receiving side of said container,
continuing said exposure until a second area of said food, which is partially shielded from microwave energy by proximetry to said metal container, defrosts and heats to a serving temperature mostly from the heat exchanger action of the metal container exchanging the cold of the food for the heat released by the condensing of said vapor, and removing said heated food package from said microwave oven.

13. In a process for heating, according to claim 12, during said microwave exposure, the added step of:

employing, within said chamber, means to convey at least part of the liquid, which results from said hot vapor condensing on said metal container, to a location, within said chamber, less shielded from microwave exposure whereupon microwave energy revaporizes said liquid and said revaporized liquid again condenses on said metal container.

14. In a process for heating, according to claim 12, where before said exposure to microwave energy, includes the added step of:

locating, outside said food container but within said chamber, a charge of lossy liquid in a position exposed to microwave energy whereupon said exposure will evaporate said liquid and cause hot vapor to condense on and heat both the exterior surface of said food and said metal container.

15. In a process for heating, according to claim 12, where one portion of said food is dough, the added step of:

locating a predetermined amount of water in contact with said dough prior to said exposure to microwave energy to slow down the baking of said dough to a time interval equal to that time required by the remaining portion of food to heat.

* * * * *